United States Patent
Zhou et al.

(10) Patent No.: US 12,476,334 B2
(45) Date of Patent: Nov. 18, 2025

(54) MANUFACTURING METHOD OF CORE ASSEMBLY FOR BATTERY, CORE ASSEMBLY FOR BATTERY, AND BATTERY PACK

(71) Applicant: Hithium Tech HK Limited, Hong Kong (CN)

(72) Inventors: Long Zhou, Fujian (CN); Yuyuan Wu, Fujian (CN); Xichong Zhang, Fujian (CN); Zhizhi Wang, Fujian (CN)

(73) Assignee: HITHIUM TECH HK LIMITED, Hongkong (CN)

( * ) Notice: Subject to any disclaimer, the term of this patent is extended or adjusted under 35 U.S.C. 154(b) by 629 days.

(21) Appl. No.: 17/956,861

(22) Filed: Sep. 30, 2022

(65) Prior Publication Data

US 2023/0127894 A1    Apr. 27, 2023

(30) Foreign Application Priority Data

Oct. 27, 2021 (CN) .......................... 202111259203.9
Oct. 27, 2021 (CN) .......................... 202122601207.2

(51) Int. Cl.
*H01M 10/0587*    (2010.01)
*H01M 10/04*      (2006.01)
*H01M 50/538*     (2021.01)

(52) U.S. Cl.
CPC ..... *H01M 50/538* (2021.01); *H01M 10/0422* (2013.01); *H01M 10/0431* (2013.01); *H01M 10/0587* (2013.01)

(58) Field of Classification Search
CPC ........... H01M 10/0431; H01M 10/045; H01M 10/0587; H01M 50/533; H01M 50/538; H01M 50/559
See application file for complete search history.

(56) References Cited

U.S. PATENT DOCUMENTS

2020/0235369 A1    7/2020  Jeong et al.
2020/0373547 A1    11/2020 Xu et al.

FOREIGN PATENT DOCUMENTS

CN    101958420 A    1/2011
CN    106410104 A    2/2017
(Continued)

OTHER PUBLICATIONS

First Office Action dated Nov. 28, 2023 received in corresponding corresponding Chinese application No. 202111259203.9.
(Continued)

*Primary Examiner* — Kevin E Yoon (57) ABSTRACT

Provided are a manufacturing method of a core assembly for battery, a core assembly for battery, and a battery pack including the core assembly. The method includes: providing a jelly-roll including a cylindrical main body and a tab group including tabs stacked in an axial direction of the main body and electrically connected to an axial end of the main body, each tab extending outward in a radial direction of the main body; providing a current collecting member including a current collecting portion; electrically connecting the current collecting portion to at least one of the tabs so that the current collecting portion extends outward in the radial direction; and bending the current collecting portion and at least one part of the tabs inward in the radial direction so that no current collecting portion or tab extends beyond an outer peripheral surface of the main body in the radial direction.

14 Claims, 6 Drawing Sheets

(56) References Cited

FOREIGN PATENT DOCUMENTS

| | | | |
|---|---|---|---|
| CN | 107534122 A | 1/2018 | |
| CN | 209104251 U | 7/2019 | |
| CN | 209217105 U | 8/2019 | |
| CN | 209232866 U | 8/2019 | |
| CN | 110419124 A | 11/2019 | |
| CN | 210136949 U | 3/2020 | |
| CN | 113422174 A | 9/2021 | |
| CN | 113437444 A * | 9/2021 | .......... H01M 50/538 |
| CN | 214378756 U | 10/2021 | |
| CN | 216120496 U | 3/2022 | |
| EP | 3147987 B1 | 8/2018 | |
| JP | 2017216111 A | 12/2017 | |
| WO | 2018190016 A1 | 10/2018 | |
| WO | 2021020117 A1 | 2/2021 | |
| WO | 2021202365 A2 | 10/2021 | |
| WO | 2021202365 A3 | 10/2021 | |

OTHER PUBLICATIONS

Extended European Search Report for European application 22203162.7 mailed Mar. 7, 2023.

* cited by examiner

MANUFACTURING METHOD OF CORE ASSEMBLY FOR BATTERY, CORE ASSEMBLY FOR BATTERY, AND BATTERY PACK

TECHNICAL FIELD

The present disclosure relates to the field of battery production technology, in particular to a manufacturing method of a core assembly for a battery, a core assembly for a battery, and a battery pack.

BACKGROUND

In the related art, when a current collecting member and a tab of a cylindrical battery are welded by using ultrasonic waves, supporting points and welding space for the welding head are required, and otherwise, poor welding contact and welding failure may be easily caused.

SUMMARY

The present disclosure is intended to at least solve one of the technical problems in the prior art. For this reason, the present disclosure aims at proposing a manufacturing method of a core assembly for a battery, a core assembly for a battery, and a battery pack including the core assembly, which have the advantages of low production difficulty and higher safety and reliability.

In a first aspect of the present disclosure, a manufacturing method of a core assembly for a battery is provided. The method includes: a step of providing a jelly-roll, wherein the jelly-roll includes a main body having a cylindrical shape and at least one tab group including a plurality of tabs, the plurality of tabs being stacked in an axial direction of the main body and being electrically connected to an axial end of the main body, each of the plurality of tabs extending outward in a radial direction of the main body; a step of providing a current collecting member, wherein the current collecting member includes at least one current collecting portion; a step of electrically connecting the at least one current collecting portion to at least one of the plurality of tabs in the at least one tab group in such a manner that the at least one current collecting portion extends outward in the radial direction of the main body; and a step of bending the at least one current collecting portion and at least one part of the plurality of tabs inward in the radial direction of the main body in such a manner that none of the at least one current collecting portion and the plurality of tabs extend beyond an outer peripheral surface of the main body in the radial direction of the main body.

In a second aspect of the present disclosure, a core assembly for a battery is provided. The core assembly includes: a jelly-roll and a current collecting member. The jelly-roll includes a main body having a cylindrical shape and at least one tab group including a plurality of tabs. The plurality of tabs are stacked in an axial direction of the main body and electrically connected to the axial end of the main body. The current collecting member includes at least one current collecting portion. The at least one current collecting portion is electrically connected to at least one of the plurality of tabs in the at least one tab group, the at least one current collecting portion and at least one part of the plurality of tabs extend outward in the radial direction of the main body, and then are bent inward in the radial direction of the main body in such a manner that none of the at least one current collecting portion and the plurality of tabs extend beyond an outer peripheral surface of the main body in the radial direction of the main body.

In a third aspect of the present disclosure, a battery pack is provided. The battery packing includes the core assembly described in the second aspect of the present disclosure.

The additional aspects and the advantages of the present disclosure will be partially set forth in the following description, and in part will be apparent from the following description, or may be learned by practice of the present disclosure.

REFERENCE NUMERALS core assembly 100,
jelly-roll 1, main body 11, tab 12,
current collecting member 2, current collecting portion 21, connection portion 22,
electrode sheet 3, support insulating layer 31, first conductive layer 32, second conductive layer 33.

DESCRIPTION OF EMBODIMENTS

The embodiments of the present disclosure will be described in detail below, and examples of the embodiments are shown in accompanying drawings, throughout which identical or similar reference numerals denote identical or similar elements or elements with identical or similar functions. The following embodiments described with reference to the drawings are illustrative and intended to explain the present disclosure, but should not be construed as limiting the present disclosure.

The manufacturing method of a core assembly 100 for a battery according to the embodiments in the first aspect of the present disclosure is described below with reference to FIGS. 1 to 7.

Figure 7:
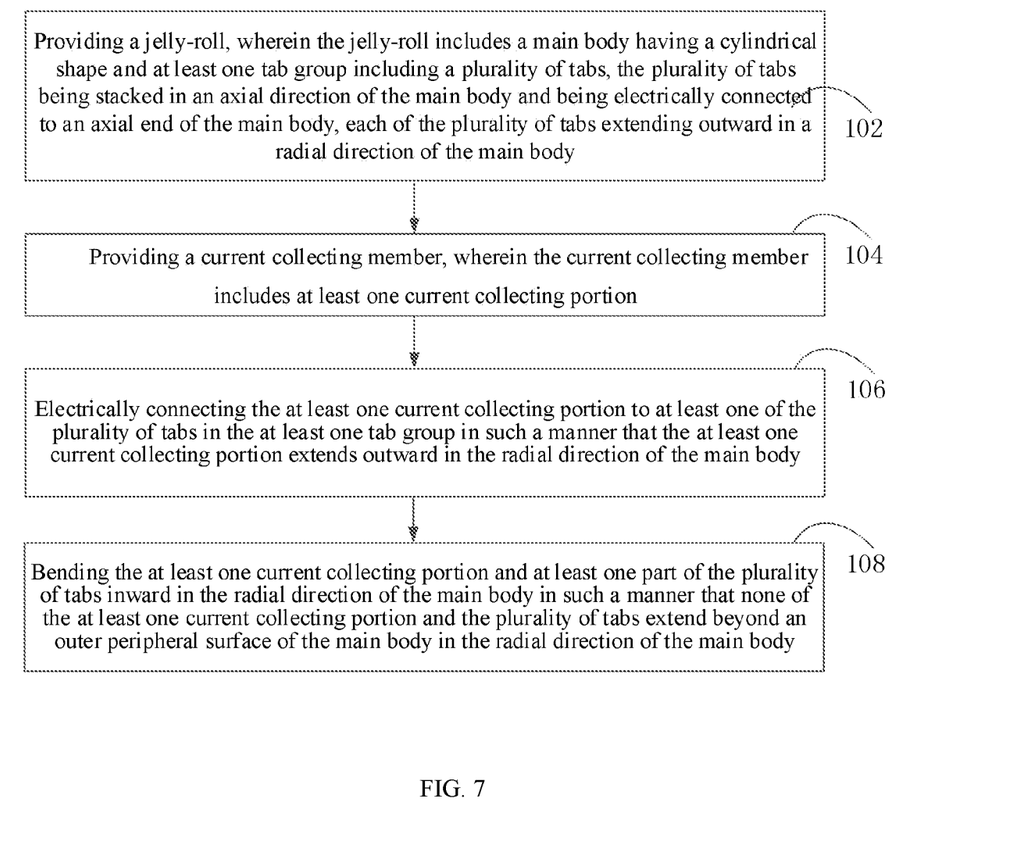
FIG. 7 is a schematic diagram of a flowchart of a manufacturing method of a core assembly 100 for a battery according to embodiments of the present disclosure.

According to some embodiments of the present disclosure, as illustrated in FIG. 7, the manufacturing method includes the following step 102 to 108.

At step 102, a jelly-roll 1 is provided. Here, referring to FIG. 1 and FIG. 2, the jelly-roll 1 includes a main body 11 having a cylindrical shape and at least one tab group including a plurality of tabs 12, the plurality of tabs 12 are stacked in an axial direction of the main body 11 and are electrically connected to an axial end of the main body 11, and each of the plurality of tabs 12 extends outward in a radial direction of the main body 11.

Figure 1:
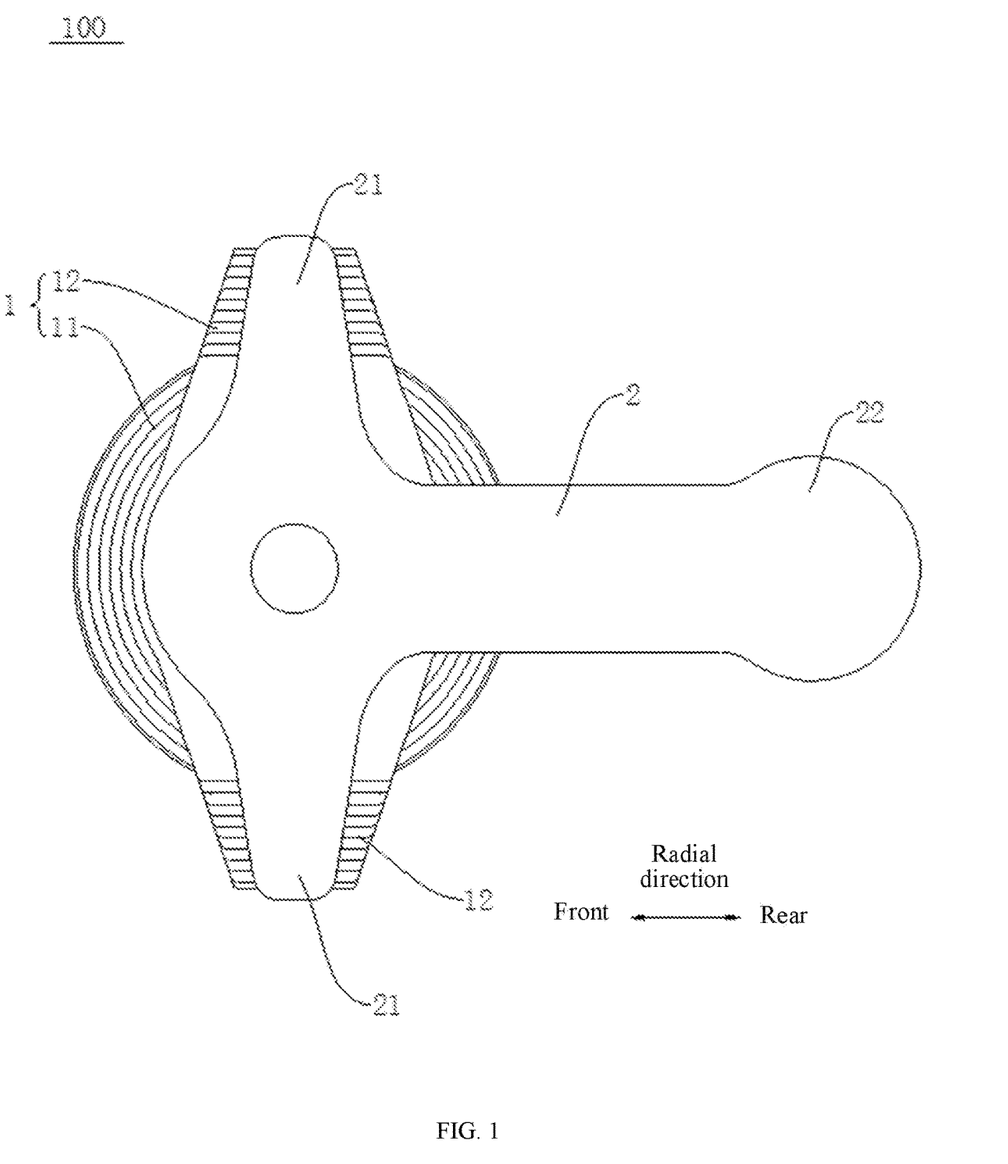
FIG. 1 is a schematic diagram of a manufacturing method of a core assembly for a battery, showing a jelly roll and a current collecting member in a state before the at least one current collecting portion and the at least one part of the plurality of tabs are bent inward in the radial direction of the main body according to embodiments of the present disclosure.
Figure 2:
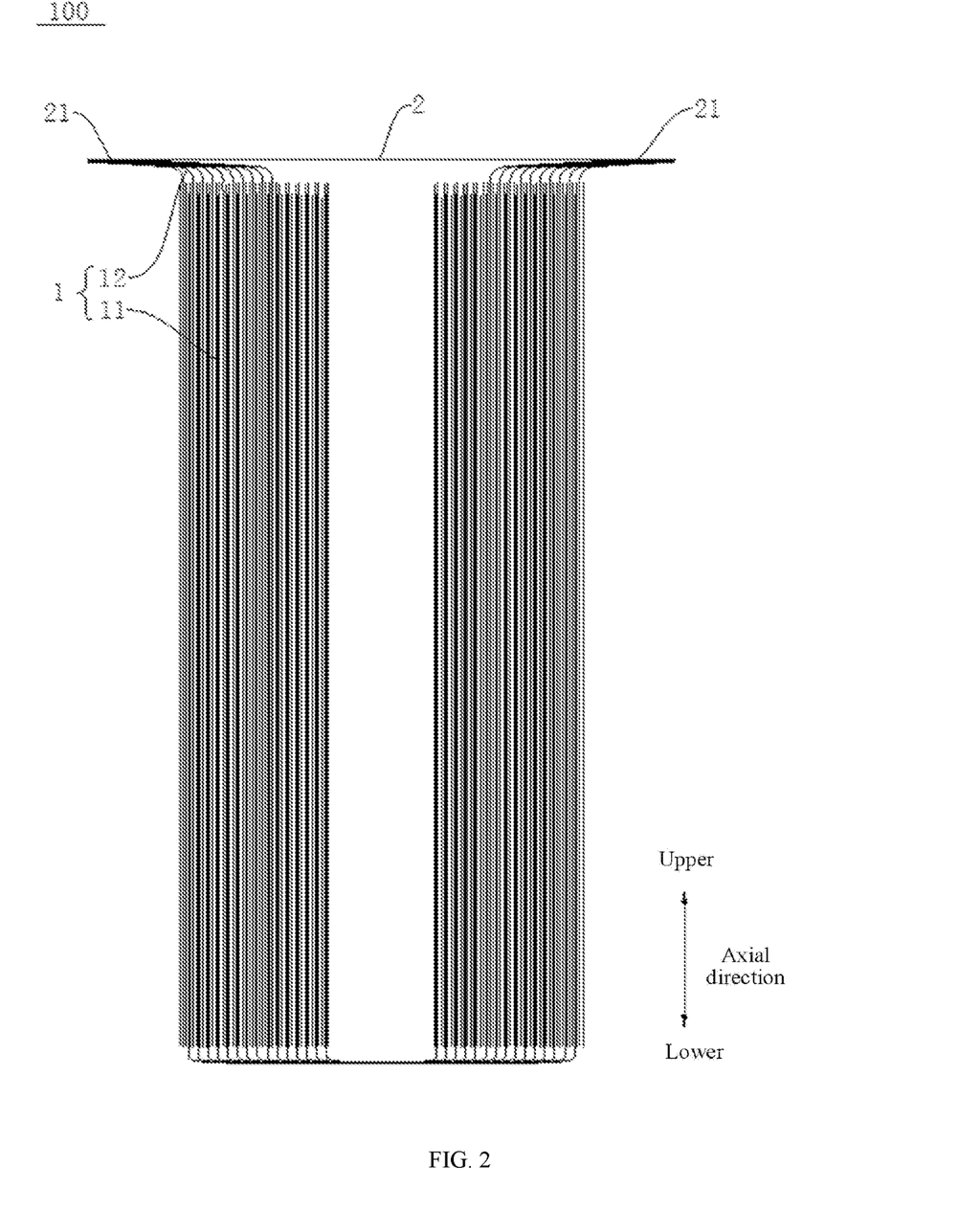
FIG. 2 is a schematic diagram of a front view of the structure shown in FIG. 1.

Referring to FIG. 1, the jelly-roll 1 includes: a main body 11 that is cylindrical; and a plurality of tabs 12 electrically connected to an axial end of the main body 11 (the upper end of the main body 11 as shown in FIG. 2). The plurality of tabs 12 is stacked in the axial direction of the main body 11. Lower ends of the plurality of tabs are connected to the main body 11, and each of the plurality of tabs extends outward in the radial direction of the main body 11.

The at least one tab group may include only one tab group or more than one tab group, for example two or three tab groups. Two tab groups are exemplarily shown in the figures. Each tab group includes a plurality of tabs 12.

At step 104, a current collecting member 2 including at least one current collecting portion 21 is provided.

The at least one current collecting portion 21 may include only one current collecting portion 21 or more than one current collecting portion 21, for example two or three current collecting portion 21. Two current collecting portions 21 are exemplarily shown in the figures.

At step 106, the at least one current collecting portion 21 is electrically connected to at least one of the plurality of tabs 12 in the at least one tab group in such a manner that the at least one current collecting portion 21 extends outward in the radial direction of the main body 11.

In some embodiments, each of the plurality of tabs 12 in the at least one tab group is electrically connected to the at least one current collecting portion 21.

In some embodiments, the at least one current collecting portion 21 is electrically connected to the at least one of the plurality of tabs 12 in the at least one tab group through ultrasonic welding. Ultrasonic welding replaces the traditional welding/bonding process as having large welding speed, high welding strength and good sealing performance. Further, ultrasonic welding is low in cost, is clean without pollution, and has no damage to the current collecting member 2 and the tabs. The welding process of ultrasonic welding is stable, and the welded position has good electrical conductivity and an extremely low or close-to-zero resistance coefficient. In addition, the ultrasonic welding requires short welding time, does not require any soldering flux, gas and solder, does not generate sparks in the welding process and is environmentally friendly and safe.

In some embodiments, the jelly-roll 1 includes a plurality of tab groups arranged at intervals in a circumferential direction of the main body 11, and the current collecting member 2 includes a plurality of current collecting portions 21; and in step 106, the plurality of current collecting portions are electrically connected to the plurality of tab groups respectively. For example, the current collecting member 2 includes a plurality of current collecting portions 21 corresponding to the plurality of tab groups one-to-one. Thus, each tab group can be electrically connected to one current collecting portion 21; the connecting strength and the connecting stability of the core assembly 100 are guaranteed; the fault rate of the core assembly 100 is lowered; and the service life of the core assembly 100 is prolonged.

At step 108, the at least one current collecting portion 21 and at least one part of the plurality of tabs 12 are bent inward in the radial direction of the main body 11 in such a manner that none of the at least one current collecting portion 21 and the plurality of tabs 12 extend beyond an outer peripheral surface of the main body 11 in the radial direction of the main body 11.

Here, the plurality of tabs 12 in each tab group are considered as a whole, and said at least one part of the plurality of tabs 12 refers to at least one part of the plurality of tabs 12 as a whole, or at least a partial segment of the plurality of tabs 12 as a whole.

In some embodiments, after the at least one current collecting portion 21 is electrically connected to the at least one of the plurality of tabs 12 in the at least one tab group and before the at least one current collecting portion 21 and the at least one part of the plurality of tabs 12 are bent inward in the radial direction of the main body 11, as shown in FIG. 1 and FIG. 0.2, each of the plurality of tabs 12 extends in a radial direction of the main body and has one end electrically connected to the axial end of the main body 11, and another end of the at least one of the plurality of tabs is electrically connected to the at least one current collecting portion 21.

In some embodiments, before the at least one current collecting portion 21 and the at least one part of the plurality of tabs 12 are bent inward in the radial direction of the main body 11, as shown in FIG. 1 and FIG. 2, the at least one part of the plurality of tabs 12 extends beyond the outer peripheral surface of the main body 11 in the radial direction of the main body 11. That is, at least one of the plurality of tabs 12 extends beyond the outer peripheral surface of the main body 11, i.e., an upper end of at least one of the plurality of tabs 12 is beyond the outer peripheral surface of the main body 11, as shown in FIG. 2. For example, another end of at least one of the plurality of tabs 12 is beyond the outer peripheral surface of the main body 11, or another end of each of the plurality of tabs 12 is beyond the outer peripheral surface of the main body 11. For example, the another end of each of the plurality of tabs 12 is perpendicular to an axis of the main body 11. The at least one current collecting portion 21 are formed on the current collecting member 2; and another end of the at least one of the plurality of tabs 12 (e.g., the another end of the at least one extending beyond the main body 11) is electrically connected to the at least one current collecting portion 21 through welding. Thus, when welding the plurality of tabs 12 and the current collecting member 2, supporting points are provided, and a space is provided for a welding head for ultrasonic welding to weld the plurality of tabs 12 and the current collecting member 2, the welding difficulty of the plurality of tabs is lowered, and the safety and the reliability of the core assembly 100 are guaranteed.

For example, referring to FIG. 1 showing a state before the at least one current collecting portion 21 and the at least one part of the plurality of tabs 12 are bent inward in the radial direction of the main body 11, an end of each of the plurality of tabs is connected to an axial end of the main body 11, the plurality of tabs extend outward in the radial direction of the main body 11, and at least one of the plurality of tabs 12 extends beyond the outer peripheral surface of the main body 11, i.e., another end of at least one of the plurality of tabs 12 is beyond the outer peripheral surface of the main body 11. The at least one current collecting portion 21 is formed on the current collecting member; and the at least one current collecting portion 21 is connected to the at least one of the plurality of tabs 12 extending beyond the main body 11.

In some embodiments, as shown in FIG. 1 and FIG. 2, after the at least one current collecting portion 21 is electrically connected to the at least one of the plurality of tabs 12 in the at least one tab group and before the at least one current collecting portion 21 and the at least one part of the plurality of tabs 12 are bent inward in the radial direction of the main body 11, the at least one current collecting portion 21 extends beyond the outer peripheral surface of the main body 11 in the radial direction of the main body 11.

Figure 3:
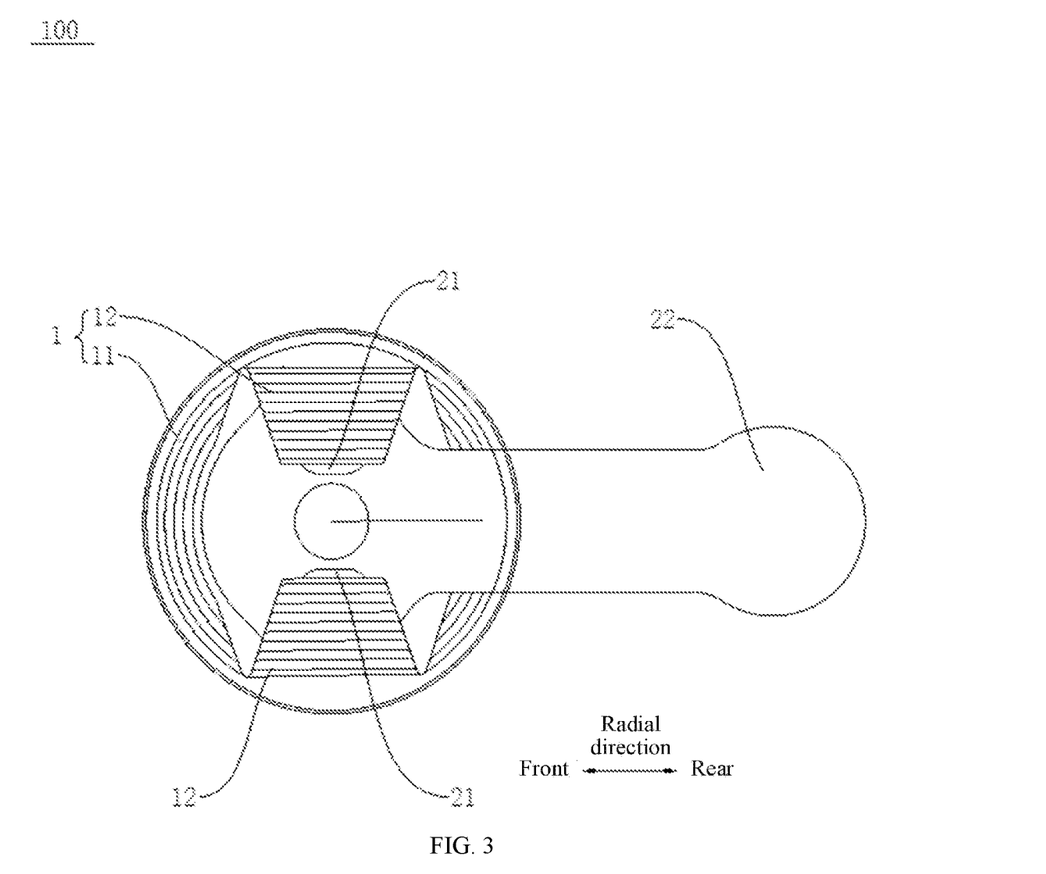
FIG. 3 is a schematic diagram of a manufacturing method of a core assembly for a battery, showing a jelly roll and a current collecting member in a state after the at least one current collecting portion and the at least one part of the plurality of tabs are bent inward in the radial direction of the main body according to embodiments of the present disclosure.
Figure 4:
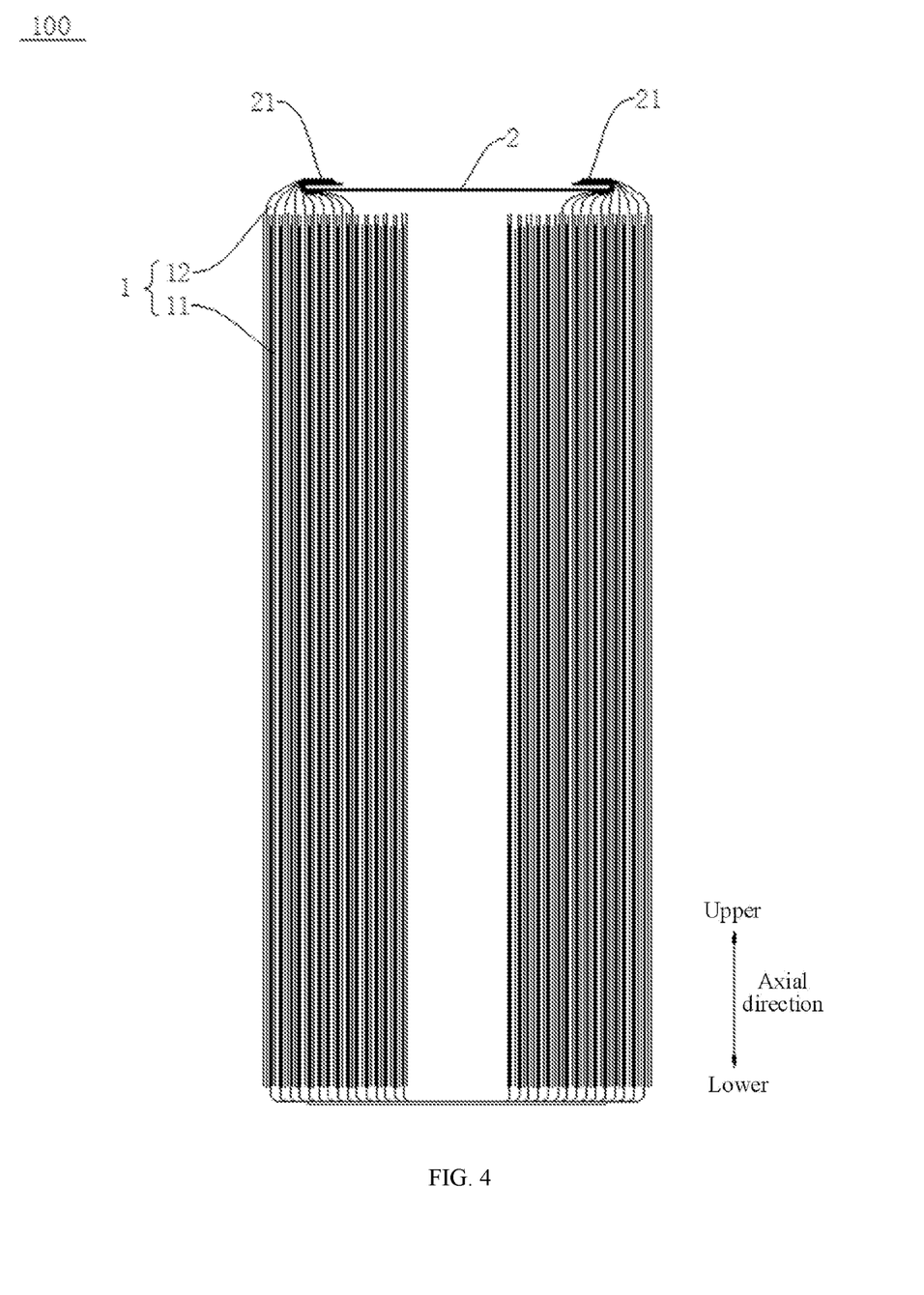
FIG. 4 is a schematic diagram of a front view of the structure shown in FIG. 3.
Figure 5:
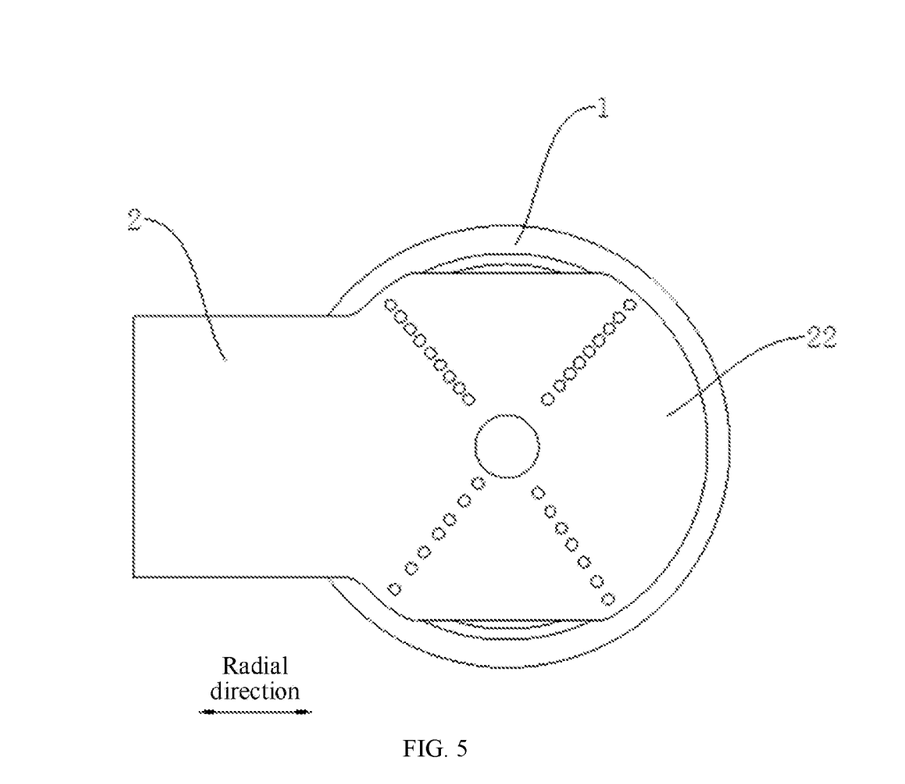
FIG. 5 is a schematic diagram of a top view of a core assembly for a battery according to embodiments of the present disclosure.
Figure 6:
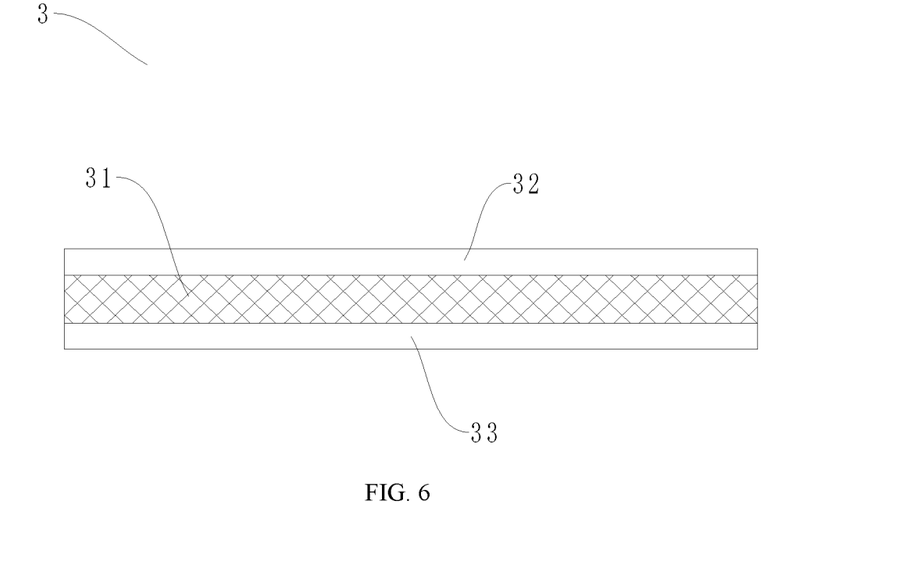
FIG. 6 is a schematic diagram of an electrode sheet.

For example, in the step 108, the at least one of the plurality of tabs 12 and the at least one current collecting portion 21, which have been electrically connected (e.g., by ultrasonic welding) in step 106, are perpendicular to the axis of the main body 11 and are folded inward in the radial direction. Referring to FIG. 3 and FIG. 4, which show a state after the at least one current collecting portion 21 and the at least one part of the plurality of tabs 12 are bent inward in the radial direction of the main body 11 front different views, in the step 108, the plurality of tabs 12 which has been welded with the current collecting member 2 and the free end of the at least one current collecting portion 21 of the current collecting member 2 (the radially outermost end of the current collecting portion 21 as shown in the figures) are perpendicular to the axis of the main body 11 and are folded inward in the radial direction. Thus, through the folding inward after the welding, the welding connections between the plurality of tabs 12 and the at least one current collecting portion 21 can be better protected, the connections can be prevented from being damaged, and the service life of the core assembly 100 is thus can be prolonged.

For the manufacturing method of the core assembly 100 according to the embodiments of the present disclosure, by designing at least one of the plurality of tabs 12 extending beyond (i.e., the another end of at least one of the plurality of tabs 12 to be beyond) the outer peripheral surface of the main body 11 to be welded to the current collecting member 2, the connecting strength of the plurality of tabs 12 is improved; the connection is stable; the reliability of the core assembly 100 is guaranteed; the welding difficulty between the jelly-roll 1 and the current collecting member 2 is lowered; welding between the plurality of tabs 12 and the at least one current collecting portion 21 of the current collecting member 2 is facilitated; the welding operation process of an operator is simplified; the manufacturing time is shortened; and the labor cost is lowered.

In some embodiments, after the at least one current collecting portion 21 is electrically connected to the at least one of the plurality of tabs 12 in the at least one tab group and before the at least one current collecting portion 21 and the at least one part of the plurality of tabs 12 are bent inward in the radial direction of the main body 11, a radially outermost end of the at least one current collecting portion 21 in the radial direction of the main body 11 is substantially flush with a radially outermost end of the at least one tab group in the radial direction of the main body 11. Referring to FIG. 1 and FIG. 2, a length of a radially outermost end, beyond the main body 11, of each current collecting portion 21 is approximately equal to a length of a radially outermost end, beyond the main body 11, of a corresponding tab group 12. Therefore, stable connection between each tab group and the current collecting member 2 is guaranteed; current passing areas between the plurality of tabs and the current collecting member 2 are increased; and heat generation is reduced.

In some embodiments, as shown in FIG. 1, the current collecting member 2 further includes a connection portion 22 connected to the at least one current collecting portion 21. For example, the connection portion 22 is spaced apart from the at least one current collecting portion 21 in the circumferential direction of the main body 11.

In some embodiments, the manufacturing method further includes a step of bending the connection portion 22 inward in the radial direction of the main body 11 and electrically connecting the connection portion 22 to the at least one part of the plurality of tabs 12; and after the at least one current collecting portion 21 is electrically connected to the at least one of the plurality of tabs 12 in the at least one tab group and before the connection portion 22 is bent inward in the radial direction of the main body 11, the connection portion 22 extends outward in the radial direction of the main body 11. For example, in the states shown in FIG. 1 and FIG. 3, one end of the connection portion 22 is connected to the at least one current collecting portion 21 and another end of the connection portion 22 extends outward in the radial direction of the main body 11. As the manufacturing of the core assembly 100 requires connecting the current collecting member 2 with a top cover through welding, the connection portion 22 is folded inward to facilitate the welding connection between the core assembly 100 and the top cover.

Referring to FIG. 1 and FIG. 2, before the connection portion 22 is bent, a front end of the connection portion 22 is connected to the at least one current collecting portion 21 and a rear end of the connection portion 22 extends outward in the radial direction of the main body 11. Referring to FIG. 3 and FIG. 4, after the connection portion 22 is bent, the rear end of the connection portion 22 is bent inward in the radial direction of the main body 11 and the rear end of the connection portion 22 is connected to the at least one part of the plurality of tabs 12 which has been connected with the at least one current collecting portion 21 and bent inward.

In some embodiments, before the at least one current collecting portion 21 and the at least one part of the plurality of tabs 12 are bent inward in the radial direction of the main body 11, the current collecting member 2 is formed in a sheet-like shape. For example, before the at least one current collecting portion 21 and the at least one part of the plurality of tabs 12 are bent inward in the radial direction of the main body 11, the current collecting member 2 is formed in a sheet-like shape and is parallel to the plurality of tabs 12. Referring to FIG. 1 and FIG. 2, which show a state before the at least one current collecting portion 21 and the at least one part of the plurality of tabs 12 are bent inward in the radial direction of the main body 11, the current collecting member 2 is formed in the sheet-like shape and is parallel to the plurality of tabs 12 (and parallel to the end surface of the main body 11, e.g., an upper end surface of the main body 11) as shown in FIG. 2; and the at least one current collecting portion 21 extends beyond the outer peripheral surface of the main body 11 in the radial direction of the main body 11. The welding head requires a supporting point and a welding space during ultrasonic welding, and the at least one current collecting portion 21 extending beyond the outer peripheral surface of the main body 11 has a sufficient welding space during welding, and provides the supporting point for the welding head, which facilitates welding and lowering the welding difficulty.

In some embodiments of the present disclosure, the jelly-roll 1 is formed by winding an electrode sheet 3. The electrode sheet 3 includes a support insulating layer 31, a first conductive layer 32, and a second conductive layer 33. The first conductive layer 32 and the second conductive layer 33 cover two opposite surfaces of the support insulating layer in a thickness direction of the support insulating layer 31, respectively. Referring to FIGS. 1 to 6, the jelly-roll 1 is formed by winding the electrode sheet 3; the support insulating layer 31 is located between the first conductive layer 32 and the second conductive layer 33; and the first conductive layer 32 and the second conductive layer 33 cover an upper surface and a lower surface of the support insulating layer 31, respectively.

A specific example of a manufacturing method of the core assembly 100 according to a specific embodiment of the present disclosure is described below with reference to FIGS. 1 to 6.

As shown in FIG. 1, the core assembly 100 includes the jelly-roll 1 and the current collecting member 2. The jelly-roll 1 includes a main body 11 and two tab groups. Each tab group includes a plurality of tabs 12 which is stacked in the axial direction of the main body 11. The current collecting member 2 has the connection portion 22 and the current collecting portions 21 formed thereon. In the manufacturing process of the core assembly 100, the jelly-roll 1 and the current collecting member 2 are provided first; the two current collecting portion 21 are electrically connected to at least one of the plurality of tabs 12 in the two tab groups through ultrasonic welding in such a manner that the two current collecting portions 21 extends outward in the radial direction of the main body 11; then the two current collecting portion 21 and at least one part of the plurality of tabs 12 are folded inward in the radial direction of the main body 11 in such a manner that none of the two current collecting portions 21 and the plurality of tabs 12 extend beyond an outer peripheral surface of the main body 11 in the radial direction of the main body 11; and the radially outermost end of the connection portion 22 is bent inward in the radial direction of the main body 11 and is connected to the at least one part of the plurality of tabs 12 (i.e., the plurality of tabs 12 which has been welded and bent) and the top cover of the core assembly 100.

The core assembly 100 for a battery according to the embodiments in the second aspect of the present disclosure is described with reference to FIGS. 1 to 6 below.

As shown in FIG. 1, the core assembly 100 for a battery according to some embodiment in the second aspect of the present disclosure includes a jelly-roll 1 and a current collecting member 2.

Specifically, the core assembly 100 includes the jelly-roll 1 and the current collecting member 2. The jelly-roll 1 includes a main body 11 having a cylindrical shape and at least one tab group each including a plurality of tabs 12. The plurality of tabs 12 is stacked in an axial direction of the main body 11 and electrically connected to an axial end of the main body 1. The current collecting member includes at least one current collecting portion 21. The at least one current collecting portion 21 is electrically connected to at least one of the plurality of tabs 12 in the at least one tab group. The at least one current collecting portion 21 and at least one part of the plurality of tabs 12 extend outward in a radial direction of the main body 11, and then are bent inward in the radial direction of the main body 11 in such a manner that none of the at least one current collecting portion 21 and the plurality of tabs 12 extend beyond an outer peripheral surface of the main body 11 in the radial direction of the main body 11.

For example, each of the plurality of tabs 12 extends in a radial direction of the main body 11 and has one end electrically connected to the axial end of the main body 11, and another end of at least one of the plurality of tabs 12 is electrically connected to the at least one current collecting portion 21.

In some embodiments, each of the plurality of tabs 12 in the at least one tab group is electrically connected to the at least one current collecting portion 21.

In some embodiments, the at least one current collecting portion 21 is electrically connected to the at least one of the plurality of tabs 12 through welding, e.g., ultrasonic welding.

In some embodiments of the present disclosure, the current collecting member further includes a connection portion 22 connected to the at least one current collecting portion, the connection portion 22 being bent inward in the radial direction of the main body 11 and electrically connected to the at least one part of the plurality of tabs 12. Further, the connection portion 22 is spaced apart from the at least one current collecting portion 21 in the circumferential direction of the main body 11. As the core assembly 100 requires connecting the current collecting member with a top cover through welding, the connection portion 22 is bent (e.g., folded) inward to facilitate the welding connection between the core assembly 100 and the top cover.

In some embodiments of the present disclosure, the jelly-roll includes a plurality of tab groups arranged at intervals in the circumferential direction of the main body 11 and the current collecting member comprises a plurality of current collecting portions electrically connected to the plurality of tab groups respectively. For example, the current collecting member 2 includes a plurality of current collecting portions 21 corresponding to the plurality of tab groups one-to-one.

For the specific structural details and advantages of the core assembly 100 of the second aspect, reference may be made to the embodiments of the manufacturing method of a core assembly 100 for a battery described above, which will not be repeated here.

The battery pack according to embodiments in the third aspect of the present disclosure includes the core assembly 100 according to the embodiment in the second aspect of the present disclosure.

In some embodiments, the battery pack includes a plurality of core assemblies 100.

For the battery pack according to the embodiments of the present disclosure, by arranging the core assembly 100 according to the embodiment in the second aspect, the safety performance of the battery pack is improved, the reliability of the battery pack is guaranteed, and dangers are avoided.

In description of the present disclosure, it should be understood that orientations or positional relationships indicated by terms "center". "longitudinal", "transverse", "length", "width", "thickness", "upper", "lower", "front", "rear", "left", "right" "vertical", "horizontal", "top", "bottom", "inner", "outer", "clockwise", "anticlockwise", "axial", "radial", "circumferential" and the like are based on orientations or positional relationships shown in the drawings, in order to facilitate the description of the present disclosure and simplify the description merely, rather than indicate or imply that the referred apparatuses or elements must have specific orientations or be constructed and operated in the specific orientations, and thus they should not be construed as limiting the present disclosure.

Besides, the terms 'first', 'second' are used only for description and shall not be interpreted as an indication or implication of relative importance or an implicit indication of the number of technical features. Thus, features defined with "first" and "second" may include at least one or more such features, either explicitly or implicitly. In the description of the present disclosure, "a plurality" means two or more, unless otherwise specifically defined.

In the present disclosure, unless otherwise specifically stated and defined, terms "mounting", "connected", "connecting", "fixing" and the like should be understood broadly, for example, fixed connection, detachable connection, or formation into an integral body; mechanical connection, electric connection, or communication connection; direct connection, indirect connection through an intermediate, or communication between the interiors of two elements or mutual acting relationship between two elements. The specific meanings of the above terms in the present disclosure may be understood by those of ordinary skill in the art according to the specific situations.

In descriptions of this specification, descriptions with reference to the terms "an embodiment", "some embodiments", "example", "specific example", "some examples" or the like mean that the specific features, structures, materials or characteristics described in conjunction with the embodiments or the examples are included in at least one embodiment or example of the present disclosure. In the present specification, the schematic representation of the above terms does not necessarily refer to the same embodiment or example. Moreover, the described specific features, structures, materials or characteristics may be combined in any one or more embodiments or examples in a suitable manner. In addition, various embodiments or examples described in the specification, as well as features of various embodiments or examples, may be combined by those skilled in the art without contradicting each other.

While the embodiments of the present disclosure have been illustrated and described, it can be understood by those of ordinary skill in the art that various changes, modifications, substitutions and variations can be made herein without departing from the principle and the objective of the present disclosure, and the scope of the present disclosure is defined by the appended claims and equivalents thereof.

What is claimed is:

1. A manufacturing method of a core assembly for a battery, comprising:
    a step of providing a jelly-roll, wherein the jelly-roll comprises a main body having a cylindrical shape and at least one tab group comprising a plurality of tabs, the plurality of tabs being stacked in an axial direction of the main body and being electrically connected to an axial end of the main body, each of the plurality of tabs extending outward in a radial direction of the main body;
    a step of providing a current collecting member, wherein the current collecting member comprises at least one current collecting portion;
    a step of electrically connecting the at least one current collecting portion to at least one of the plurality of tabs in the at least one tab group in such a manner that the at least one current collecting portion extends outward in the radial direction of the main body; and
    a step of bending the at least one current collecting portion and at least one part of the plurality of tabs inward in the radial direction of the main body in such a manner that none of the at least one current collecting portion and the plurality of tabs extend beyond an outer peripheral surface of the main body in the radial direction of the main body, wherein the current collecting member further comprises a connection portion connected to the at least one current collecting portion, wherein the method further comprises: bending the connection portion inward in the radial direction of the main body and electrically connecting the connection portion to the at least one part of the plurality of tabs, wherein the connection portion extends outward in the radial direction of the main body, after the at least one current collecting portion is electrically connected to the at least one of the plurality of tabs in the at least one tab group and before the connection portion is bent inward in the radial direction of the main body.

2. The manufacturing method according to claim 1, wherein each of the plurality of tabs in the at least one tab group is electrically connected to the at least one current collecting portion.

3. The manufacturing method according to claim 1, wherein the at least one current collecting portion is electrically connected to the at least one of the plurality of tabs in the at least one tab group through ultrasonic welding.

4. The manufacturing method according to claim 1, wherein before the at least one current collecting portion and the at least one part of the plurality of tabs are bent inward in the radial direction of the main body, the at least one part of the plurality of tabs extends beyond the outer peripheral surface of the main body in the radial direction of the main body.

5. The manufacturing method according to claim 4, wherein after the at least one current collecting portion is electrically connected to the at least one of the plurality of tabs in the at least one tab group and before the at least one current collecting portion and the at least one part of the plurality of tabs are bent inward in the radial direction of the main body, the at least one current collecting portion extends beyond the outer peripheral surface of the main body in the radial direction of the main body.

6. The manufacturing method according to claim 5, wherein after the at least one current collecting portion is electrically connected to the at least one of the plurality of tabs in the at least one tab group and before the at least one current collecting portion and the at least one part of the plurality of tabs are bent inward in the radial direction of the main body, a radially outermost end of the at least one current collecting portion in the radial direction of the main body is substantially flush with a radially outermost end of the at least one tab group in the radial direction of the main body.

7. The manufacturing method according to claim 1, wherein
    the jelly-roll comprises a plurality of tab groups arranged at intervals in a circumferential direction of the main body; and
    the current collecting member comprises a plurality of current collecting portions,
    wherein in the step of electrically connecting the at least one current collecting portion to at least one of the plurality of tabs in the at least one tab group, the plurality of current collecting portions are electrically connected to the plurality of tab groups respectively.

8. The manufacturing method according to claim 1, wherein the current collecting member is formed in a sheet-like shape, before the at least one current collecting portion and the at least one part of the plurality of tabs are bent inward in the radial direction of the main body.

9. A core assembly for a battery, comprising:
    a jelly-roll comprising a main body having a cylindrical shape and at least one tab group comprising a plurality of tabs, wherein the plurality of tabs are stacked in an axial direction of the main body and electrically connected to an axial end of the main body; and
    a current collecting member comprising at least one current collecting portion,
    wherein the at least one current collecting portion is electrically connected to at least one of the plurality of tabs in the at least one tab group,
    the at least one current collecting portion and at least one part of the plurality of tabs extend outward in the radial direction of the main body, and then are bent inward in the radial direction of the main body in such a manner that none of the at least one current collecting portion and the plurality of tabs extend beyond an outer peripheral surface of the main body in the radial direction of the main body, wherein: the current collecting member further comprises a connection portion connected to the at least one current collecting portion, the connection portion being bent inward in the radial direction of the main body and electrically connected to the at least one part of the plurality of tabs.

10. The core assembly according to claim 9, wherein each of the plurality of tabs in the at least one tab group is electrically connected to the at least one current collecting portion.

11. The core assembly according to claim 9, wherein:
the jelly-roll comprises a plurality of tab groups arranged at intervals in a circumferential direction of the main body; and
the current collecting member comprises a plurality of current collecting portions electrically connected to the plurality of tab groups respectively.

12. A battery, comprising a core assembly comprising:
a jelly-roll comprising a main body having a cylindrical shape and at least one tab group comprising a plurality of tabs, wherein the plurality of tabs are stacked in an axial direction of the main body and electrically connected to an axial end of the main body; and
a current collecting member comprising at least one current collecting portion,
wherein the at least one current collecting portion is electrically connected to at least one of the plurality of tabs in the at least one tab group,
the at least one current collecting portion and at least one part of the plurality of tabs extend outward in the radial direction of the main body, and then are bent inward in the radial direction of the main body in such a manner that none of the at least one current collecting portion and the plurality of tabs extend beyond an outer peripheral surface of the main body in the radial direction of the main body, wherein: the current collecting member further comprises a connection portion connected to the at least one current collecting portion, the connection portion being bent inward in the radial direction of the main body and electrically connected to the at least one part of the plurality of tabs.

13. The battery according to claim 12, wherein each of the plurality of tabs in the at least one tab group is electrically connected to the at least one current collecting portion.

14. The battery according to claim 12, wherein:
the jelly-roll comprises a plurality of tab groups arranged at intervals in a circumferential direction of the main body; and
the current collecting member comprises a plurality of current collecting portions electrically connected to the plurality of tab groups respectively.

\* \* \* \* \*